US007634422B1

(12) United States Patent
Andre et al.

(10) Patent No.: US 7,634,422 B1
(45) Date of Patent: Dec. 15, 2009

(54) SYSTEM AND METHOD FOR COMPLEX SCHEDULE GENERATION

(75) Inventors: David Andre, Berkeley, CA (US); Illah Nourbakhsh, Pittsburgh, PA (US); Serdar Uckun, Palo Alto, CA (US)

(73) Assignee: Verint Americas Inc., Melville, NY (US)

( * ) Notice: Subject to any disclaimer, the term of this patent is extended or adjusted under 35 U.S.C. 154(b) by 0 days.

(21) Appl. No.: 11/736,124

(22) Filed: Apr. 17, 2007

Related U.S. Application Data

(63) Continuation of application No. 11/479,924, filed on Jun. 30, 2006, now Pat. No. 7,254,546, which is a continuation of application No. 09/825,589, filed on Apr. 3, 2001, now Pat. No. 7,155,399.

(51) Int. Cl.
*G06Q 10/00* (2006.01)
(52) U.S. Cl. .............................. 705/9; 705/11
(58) Field of Classification Search ............. 705/7, 705/8
See application file for complete search history.

(56) References Cited

U.S. PATENT DOCUMENTS

| 3,594,919 | A | 7/1971 | De Bell et al. |
|---|---|---|---|
| 3,705,271 | A | 12/1972 | De Bell et al. |
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,016,272 | A | 5/1991 | Stubbs et al. |
| 5,101,402 | A | 3/1992 | Chiu et al. |
| 5,117,225 | A | 5/1992 | Wang |

(Continued)

FOREIGN PATENT DOCUMENTS

EP  0453128 A2  10/1991

(Continued)

OTHER PUBLICATIONS

"Customer Spotlight: Navistar International," Web page, unverified print date of Apr. 1, 2002..

(Continued)

*Primary Examiner*—Jonathan G Sterrett

(57) ABSTRACT

A system and method for generating a schedule for multiple employees in a complex environment. In one embodiment, the method includes generating a schedule for multiple employees with varying skill sets for a time period, wherein the plurality of employees have varying overlapping skill sets that enable them to perform various tasks, and wherein employees are shared across tasks within the time period. In one embodiment, the method includes receiving a plurality of user inputs to a scheduling program, including a number of employee designations that each refer to a unique employee, and a number of skill sets that each correspond to one of the employee designations. The method further includes receiving a user input that changes the number of employee designations by indicating at least one changed employee, and estimating an effect of the at least one changed employee on effective staffing levels for each of the various tasks. The method further includes generating estimated effective staffing levels for each of the various tasks.

12 Claims, 4 Drawing Sheets

U.S. PATENT DOCUMENTS

| | | |
|---|---|---|
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |

| | | | |
|---|---|---|---|
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0013560 | A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10. 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002..

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).
O'Herron, "CenterForce Technologies CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle, *Will The Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza While You Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

SYSTEM AND METHOD FOR COMPLEX SCHEDULE GENERATION

CROSS-REFERENCE TO RELATED APPLICATION

This application is a continuation of copending U.S. utility application having Ser. No. 11/479,924, filed Jun. 30, 2006 which is a continuation of U.S. utility application having Ser. No. 09/825,589, filed Apr. 3, 2001, now U.S. Pat. No. 7,155,399, issued on Dec. 26, 2006, both of which are entirely incorporated herein by reference.

FIELD OF THE INVENTION

The invention is in the field of generating complex schedules in dynamic environments, such as call centers.

BACKGROUND

Generating schedules for employees is a complex problem for enterprises. Telephone call center scheduling is an example of a scheduling problem with a large number of variables. Variables include call volume at a particular time of day, available staff, skills of various staff members, call type (e.g., new order call and customer service call), and number of call queues, where a queue may be assigned a particular call type. A basic goal of call center scheduling is to minimize the cost of operators, or agents, available to answer calls while maximizing service. Quality of service, or service level, can be quantified in various ways. One common metric for call service level is the percentage of incoming calls answered in a predetermined time, e.g. thirty seconds. The call center may receive calls of various types that are assigned to respective call queues.

Traditionally, call center scheduling is performed by first forecasting incoming call volumes and estimating average talk times for each time period t (based on past history and other measures). The forecast is based upon historical data. Next, a closed-form formula known as reverse Erlang-C is used to compute full-time equivalent (FTE) agent requirements to provide a desired service level for each time period t. Such a method is described in Elementary Queuing Theory and Telephone Traffic, by Petr Beckmann, 1977 (Lee's abc of the Telephone Training Manuals, Geneva, Ill.) After the FTE agent requirements are computed, the required number of agents are scheduled for each time period t.

At a call center, calls of different types are typically placed onto different queues by an Automatic Call Distributor (ACD). The calls wait at the ACD for an operator to answer them. At many modern call centers, the agents cannot answer any type of call; they can only answer calls for which they have the prerequisite skill. At some call centers, there is a group of agents for each type of call that comes in, which means that each group (and queue of calls) can be treated as a separate problem. However, at an increasing number of call centers, agents are multi-skilled, and can answer calls from a variety of queues. Typically, not all agents have the same skills, and thus some agents can answer some calls while other agents cannot. The ACD distributes calls waiting in different queues to agents who are skilled to handle calls from the respective queues. This distribution task is referred to as skill-based routing. Determining agent schedules for this latter type of call center is known as the skill-based scheduling problem. It is considerably more difficult than the basic call center scheduling problem because of all the interactions between queues.

The skills-based scheduling problem has no known closed-form solution that can be used to estimate available FTE levels for each queue when agents are shared among queues. Prior attempts to solve the skills-based scheduling problem involve the use of a discrete event ACD simulator to validate estimates. For example, the skills-based scheduling technique disclosed in U.S. Pat. No. 6,044,355 includes forming skill groups that contain agents with identical sets of skills, preferences, and priorities. A "skill group availability array" is then generated that attempts to estimate what percentage of scheduled agents of each skill type will be available to each call type during each time interval. Erlang processing and ACD simulation are used to increase the accuracy of the percentage estimates, and standard call center schedule algorithms can then be used for scheduling.

Such prior solutions have other serious limitations. For example, the array grows exponentially as the number of skills grow. This is particularly true because the skill group is inflexible in that each different combination of skill, preference, priority, and proficiency requires the creation of a new skill group. The size of the array may thus reach a level at which processing time is too great and processing resources are inadequate. Another limitation of prior methods is that they do not allow for the easy determination of fine-grain changes to the schedule such as the addition or subtraction of a single agent. The current methods require that the entire algorithm be executed again for any incremental change, such as the addition or subtraction of one agent.

Other prior methods for skills-based scheduling use skill groups (similar to those disclosed in U.S. Pat. No. 6,044,355) and are limited to the assumption that each individual agent simply splits time at a predetermined ratio between various queues (task switching). In such methods, at any given time, each agent is limited to taking calls from queues assigned to his or her skill group at that time. Each agent is unable to take calls from other queues that he or she may be skilled in. This is a serious limitation, potentially causing some queues to overflow because the assigned skill group is busy, while there may be idle agents in other skill group who are capable of taking those calls.

Another serious limitation of prior methods is that they provide relatively coarse approximations of schedules that fail to take into account all of the dynamics of a situation. For example, if an agent from a new skill group is added to the schedule, the performance of call queues that are not handled by the new agent may change. These complex dynamics are not modeled well in available scheduling methods.

Another limitation of current methods is that simulation must be performed for each iteration of the algorithm. One reason for this requirement is the failure of prior methods to estimate individual contributions of single agents to particular queues. This is expensive and time consuming.

Yet another disadvantage of prior methods for solve scheduling problems is that the algorithms of prior methods may require excessive time to execute because the prior methods are not designed to facilitate parallel processing.

SUMMARY OF THE DISCLOSURE

A system and method for generating a schedule for multiple employees in a complex environment is described. In one embodiment, the method includes generating a schedule for multiple employees with varying skill sets for a time period, wherein the plurality of employees have varying overlapping skill sets that enable them to perform various tasks, and wherein employees are shared across tasks within the time period. In one embodiment, the method includes receiving a plurality of user inputs to a scheduling program, including a number of employee designations that each refer to a unique employee, and a number of skill sets that each correspond to one of the employee designations. The method further includes receiving a user input that changes the number of employee designations by indicating at least one changed employee, and estimating an effect of the at least one changed employee on effective staffing levels for each of the various tasks. The method further includes generating estimated effective staffing levels for each of the various tasks.

DETAILED DESCRIPTION

A system and method for generating complex schedules in complex environments, such as call center environments, is described. The embodiments described include generating schedules for multiple employees, or agents, each having different sets of skills that enable them to perform various tasks. An agent may be shared across various tasks within one scheduled time period.

Figure 1:
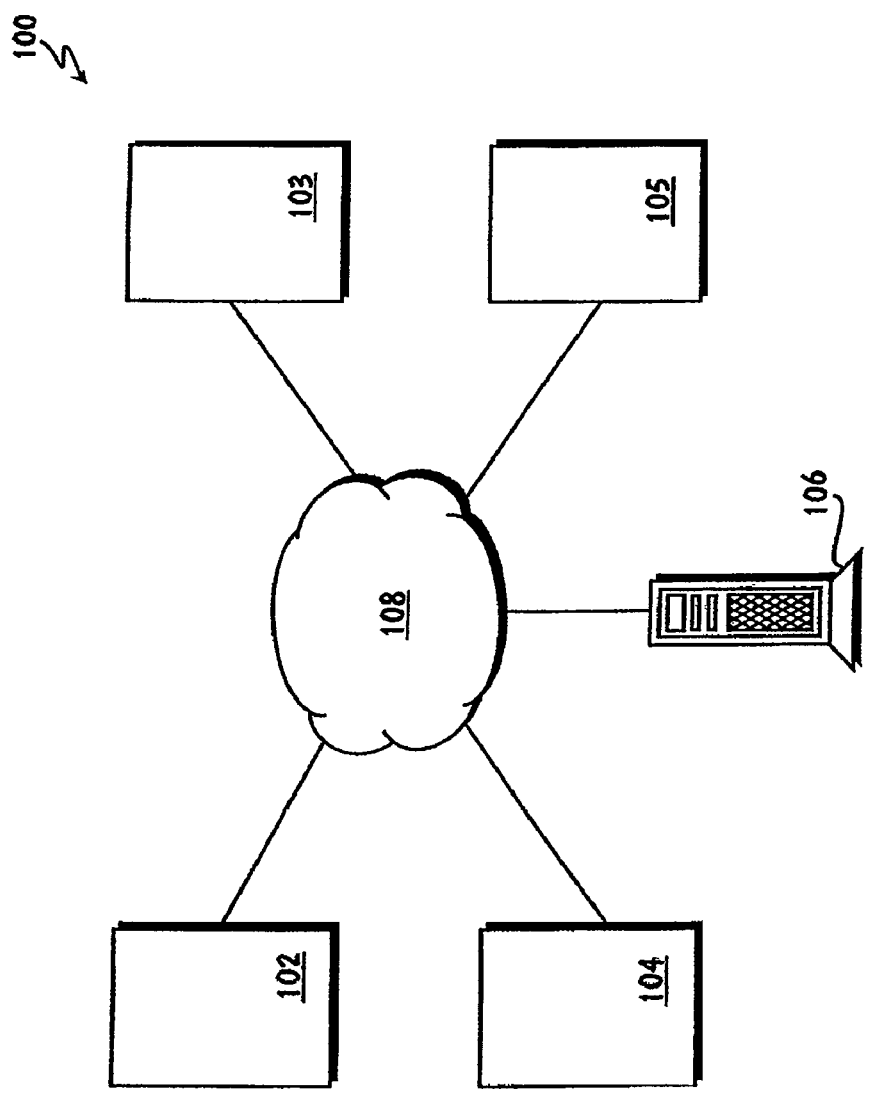
FIG. 1 is a block diagram of an embodiment of a system for complex schedule generation.

FIG. 1 is an embodiment of a system 100 for generating complex schedules. The system includes multiple client computers 102-105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for generating complex schedules are carried out on the system 100 by software instructions executing on one or more of the client computers 102-105. The software instructions may be stored on the server 106 or on any one of the client computers. For example, one embodiment is a hosted application used by a call center of an enterprise that requires complex scheduling of many employees. The software instructions are stored on the server and accessed through the network by a client computer operated by the enterprise. In other embodiments, the software instructions may be stored and executed on the client computer. Data required for the execution of the software instructions can be entered by a user of the client computer with the help of a specialized user interface. Data required for the execution of the software instructions can also be accessed via the network and can be stored anywhere on the network.

One example of a complex schedule is an agent schedule for a call center. A call center is an organization that answers calls from customers of an enterprise. An agent is an employee that is trained to answer calls. Each agent can have a different skill set. For example, one agent may be trained to answer live telephone help inquiries regarding certain products, respond to email regarding certain products, receive telephone purchase orders for certain products, etc. The agent may be assigned to multiple call queues within a time period. A call queue handles one type of contact requiring a particular skill or skills. The possible number of skill sets includes every permutation of combinations of the existing skills in the organization. Each agent has a particular skill set, but the skill sets among different agents may overlap. In embodiments of the invention, as described more fully below, a user who is performing scheduling can quickly determine the overall effect on the entire schedule of removing or adding a single agent or more without restarting the entire scheduling process. The overall effect on the schedule accounts for the effect on each call queue, even those queues that are not worked by the agent or agents being added or subtracted from the schedule. These queues are affected because the agents handling those queues will have more or less time to spend handling those queues as a result of handling more or less work on the queues that are usually worked by the agent or agents being added or subtracted. Embodiments of the invention also reduce the number of schedule simulations required in the scheduling process by performing simulations only at intervals. As described more fully below, it is determined at what intervals simulation is necessary.

Figure 2:
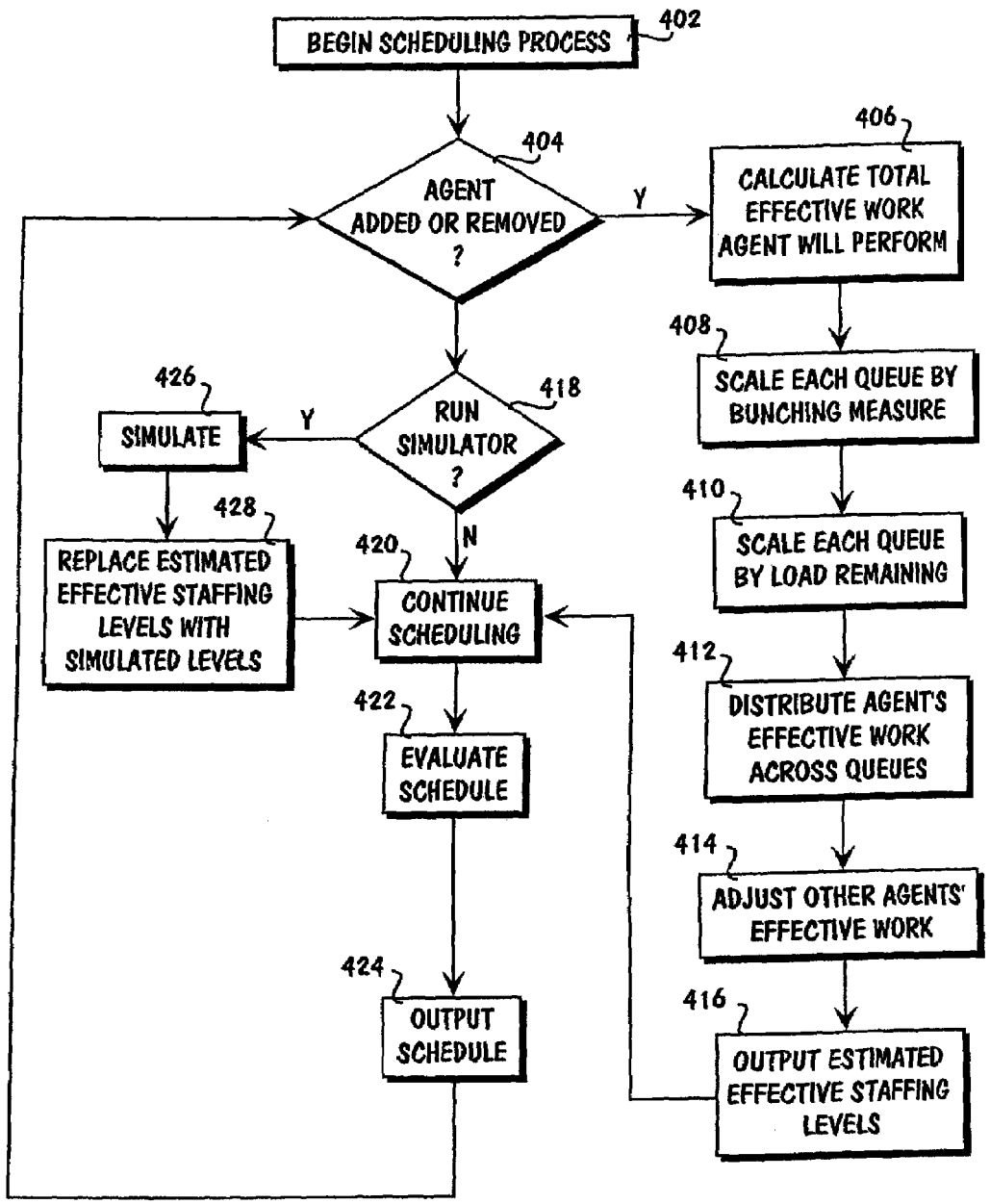
FIG. 2 is a flow diagram of an embodiment of complex schedule generation.

FIG. 2 is a high-level flow diagram of one embodiment of complex scheduling. The scheduling process is begun at 402. The scheduling process includes a user interacting with a scheduling program through a user interface. The scheduling process includes the user making entries such as agent designations, agent skills, agent preference, and agent priorities. An agent designation can be a name, a social security number, an employee number, or any other designation that uniquely identifies an employee.

At 404, it is determined whether the user has added an agent to the schedule or removed an agent from the schedule. If the user has made such a change, an estimation function generates an estimate of the resultant change in the effective staffing of each queue. In one embodiment, the estimation function is described at a high level by 406-416. The estimation function takes as inputs the skill set, proficiencies, priorities, and preferences of the added or removed agent, or "changed agent". The estimation function also takes various statistics about each queue as input. The various statistics include call volume, average handling time per call, and the performance as measured by a previous simulation.

At 406, the total effective work the changed agent will perform is calculated. As a function of call center configuration statistics, including but not limited to the number of queues the agent is trained to handle, the total amount of effective work (i.e. effective FTE's, or effective Erlangs of work) that the agent will do is calculated. In one embodiment a lookup table is used. In the lookup table, the number of queues is the index and the amount of effective work contributed is the data. This lookup table can be populated empirically using a simulator, or it can be populated empirically using measurements from a sample of real call centers. The lookup table can also be designed to be adaptively filled and changed over time to most closely correspond to events in a particular call center. For discussion purposes, the total work estimated for an agent is called "W".

As shown at 408 and 410, the bunching factors for each queue and load remaining factors for each queue are calculated and used to scale each queue. Other factors may also be used to scale each queue. The bunching measure is defined as (average handle time)/(calls per time interval). Load remaining is defined as (average handle time) X (number of calls not answered in a predetermined service time). Bunching and load remaining are combined, either as a linear combination or through multiplication, which yields an overall index for each queue. The overall index for each queue is called the "I" of the queue. At 412 the total work computed, or W, is distributed across all the affected queues in linear proportion to the I values of all those queues. For all agents other than the changed agent, work distribution is recalculated as described above. This is effectively like assuming that every remaining agent is removed and re-added to the schedule, allowing the algorithm to proceed again. The addition of the changed agent causes the load remaining to change, and the adjustment of all remaining agents compensates for and empirically mimics second-order effects. All other agents' effective work is adjusted at 414. An estimate of effective staffing levels is output at 416.

If an agent has not been added or removed at 404, it is next determined whether the simulator should be run at 418. An adaptive algorithm is used to determine whether the simulator should be run. In one embodiment, the adaptive algorithm measures the cumulative error of using the estimation function from the results of simulation and uses it and a predetermined amount of allowed error to choose how many changes can be made to the schedule before running a simulation.

If it is determined that the simulator is not required, the scheduling process continues at 420. If it is determined that a simulation should be run, then the current schedule is simulated at 426. After simulation, the estimated effective staffing levels that were output at 416 are replaced by simulated effective staffing levels, and scheduling continues at 420. The schedule is evaluated at 422 to determine whether it is an acceptable schedule based upon predetermined criteria. If the schedule is acceptable, it is output at 424.

Figure 3:
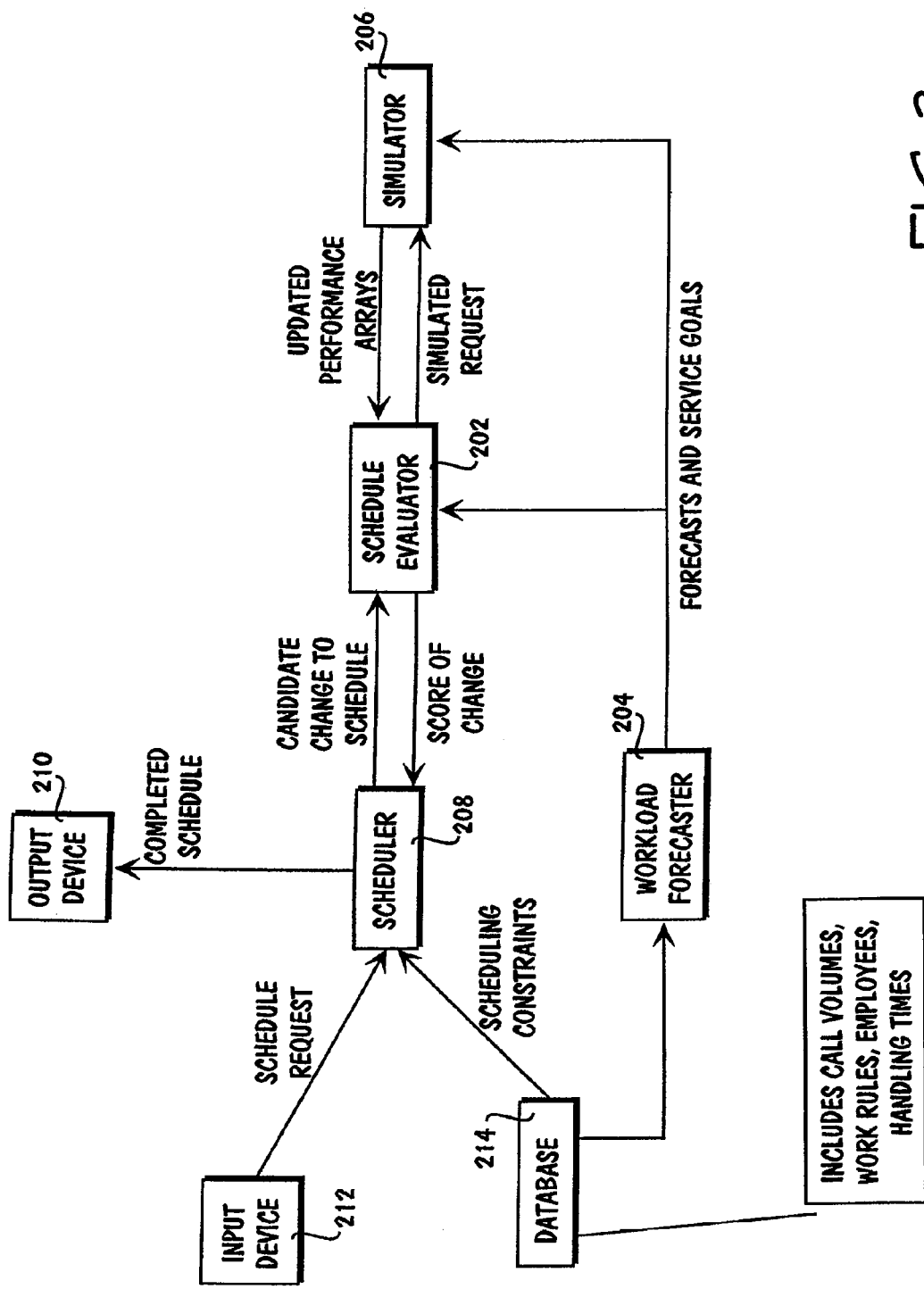
FIG. 3 is a block diagram showing the relationship between elements in an embodiment.

FIG. 3 is a block diagram showing the relationship between elements in an embodiment of the invention. The user accesses scheduling software, or scheduler, 208, using input device 212. Data from database 214, including call volumes, work rules, employee or agent designations, and handling times provide scheduling constraints for scheduler 208. The data from database 214 also provides input to the workload forecaster 204, which outputs forecasts of workload and service goals. The schedule evaluator 202 evaluates schedule changes generated by the scheduler 208 and returns a score for the change. Based upon the score, the scheduler 208 determines whether to output a completed schedule to the output device 210 or to continue. The schedule evaluator also determines whether to simulate as previously described. The scheduler sends a request to the simulator 206 if a simulation is required. The simulator provides an estimate of the performance of the schedule in the form of updated staffing arrays, which include simulated effective staffing levels.

Figure 4:
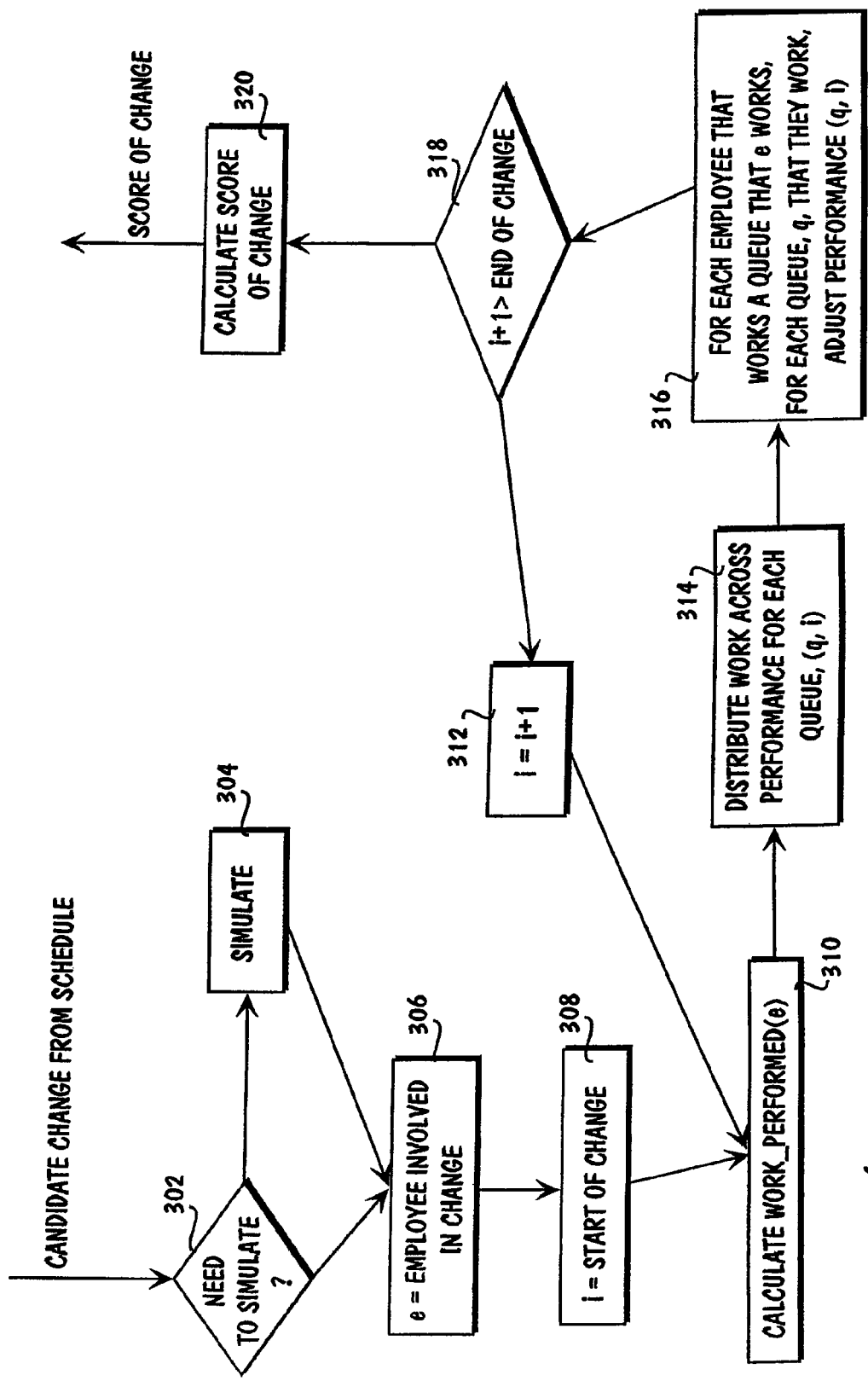
FIG. 4 is a diagram showing information flow in a schedule evaluator of one embodiment.

FIG. 4 is a diagram showing information flow in a schedule evaluator of one embodiment. When a candidate change occurs, it is determined at 302 whether to simulate. A candidate change is the addition or removal of an agent from the schedule by the user. Simulation occurs at 304, or if simulation is not required, the employee involved in the change is assigned a variable "e" at 306. The variable "i" represents a relatively small increment of time within a previously defined time period which the schedule is intended to cover, as shown at 308. The work performed by the changed employee is calculated at 310, and effect of the work on performance is distributed across each queue at 314. For each employee that works a queue also worked by the changed employee, and for each queue that each of those employees work, performance contributed by each of those employees is adjusted at 316. Next, it is determined whether the end of the previously defined time period affected by the change has been reached. That is, it is determined whether the effect of the change has been accounted for over the defined time period. If the end of the defined time period has been reached, the score of the change is calculated at 320. If the end of the defined time period has not been reached at 318, the time is incremented at 312, the calculation of work performed by e is repeated at 310, and the flow resumes as before.

Another aspect of the invention is the division of the scheduling method into parts for parallel processing. Parallel processing uses different processors simultaneously to perform different parts of the method for increased speed and efficiency. In one embodiment, simulation can be performed on one processor while scheduling is performed on one or more different processors. In another embodiment, the defined period to be scheduled is broken into sub-periods of, for example, fifteen minutes each. The scheduling of each sub-period is performed on a different processor.

The invention claimed is:

1. A system for generating a schedule for a plurality of employees in a customer center environment, the system comprising:
   at least one storage device; and
   at least one processing device coupled to the at least one storage device, the at least one processing device being operative to access instructions stored in the at least one storage device, the instructions, when executed, causing the at least one processing device to,
      receive a plurality of user inputs to a scheduling program, including a number of employee designations each of which refers to a unique employee,
      receive a user input that changes the number of employee designations by indicating at least one changed employee,
      estimate an effect of the at least one changed employee on effective staffing levels for each of various tasks,
      determine whether to simulate the schedule based at least in part on an adaptive algorithm, and
      generate estimated effective staffing levels for each of the various tasks.

2. The system of claim 1, wherein the instructions corresponding to the adaptive algorithm, when executed, cause the at least one processing device to measure an error that results from the estimating step to determine whether to simulate the schedule.

3. The system of claim 2, wherein the instructions corresponding to the adaptive algorithm, when executed, cause the at least one processing device to determine how many changes can be made to the schedule based on the error and a predetermined amount of allowed error to determine whether to simulate the schedule.

4. The system of claim 1, wherein the instructions, when executed, further cause the at least one processing device to determine a number of changes that can be made to the schedule during the scheduling process without simulating a proposed schedule.

5. The system of claim 4, wherein the instructions, when executed, further cause the at least one processing device to:
   calculate a total effective work a changed employee will perform;
   scale each task by at least one predetermined factor; and
   adjust a measure of effective work for every unique employee other than the changed employee based upon the total effective work the changed employee will perform.

6. The system of claim 5, further comprising distributing the changed employee' effective work across the various tasks.

7. The system of claim 5, wherein the at least one predetermined factor includes a measure of average time to handle a subtask divided by a number of subtasks per time interval, and a measure of how much work remains in a task based upon results of a previous simulation.

8. The system of claim 5, wherein calculating the total effective work the changed employee will perform comprises applying a function to: a number of skills of the changed employee; proficiencies of the changed employee; and priorities of the changed employee.

9. The system of claim 5, wherein adjusting the work distribution for every unique employee other than the changed employee includes adjusting an effective contribution to each task worked by one of the other unique employees by a factor reflecting that a different amount of work will be required for tasks worked by the changed employee.

10. An electromagnetic storage medium containing executable instructions which, when executed in a processing system, cause the system to generate a schedule in a customer center environment, wherein generating the schedule comprises:
   receiving a plurality of user inputs to a scheduling program, including a number of employee designations each of which refers to a unique employee;
   receiving a user input that changes the number of employee designations by indicating at least one changed employee;
   estimating an effect of the at least one changed employee on effective staffing levels for each of various tasks;
   determining whether to simulate the schedule based at least in part on an adaptive algorithm; and
   generating estimated effective staffing levels for each of the various tasks.

11. The electromagnetic medium of claim 10, wherein the instructions corresponding to the adaptive algorithm, when executed, cause the processing system to measure an error that results from the estimating step to determine whether to simulate the schedule.

12. The electromagnetic medium of claim 11, wherein the instructions, when executed, cause the processing system to determine how many changes can be made to the schedule based on the error and a predetermined amount of allowed error to determine whether to simulate the schedule.

* * * * *